United States Patent [19]

Lause et al.

[11] Patent Number: 5,565,056
[45] Date of Patent: Oct. 15, 1996

[54] PLURAL EXTRUDER METHOD FOR MAKING A COMPOSITE BUILDING PANEL

[75] Inventors: Herbert J. Lause; Sylvia S. Moore; Daniel W. King, all of Sidney, Ohio

[73] Assignee: Aluminum Company of America, Pittsburgh, Pa.

[21] Appl. No.: 440,568

[22] Filed: May 15, 1995

Related U.S. Application Data

[63] Continuation-in-part of Ser. No. 52,951, Apr. 23, 1993, abandoned.

[51] Int. Cl.$^6$ ................................................ B29C 47/06
[52] U.S. Cl. ............... 156/243; 156/244.12; 156/244.27; 156/324; 264/257
[58] Field of Search .............................. 428/288; 52/309.7, 52/309.11, 310, 192; 264/DIG. 69, 115, 210.2, 257, 173.18, 271.1; 156/243, 244.12, 244.27, 324

[56] References Cited

U.S. PATENT DOCUMENTS

| | | | |
|---|---|---|---|
| 3,765,998 | 10/1973 | Oswald | 156/244.27 |
| 4,302,269 | 11/1981 | Steinberg | 156/324 |
| 4,304,622 | 12/1981 | Krumm | 156/243 |
| 4,308,702 | 1/1982 | Rajewski . | |
| 4,448,739 | 5/1984 | Baus | 156/244.12 |
| 4,652,326 | 3/1987 | Spielau | 156/244.27 |
| 4,788,088 | 11/1988 | Kohl | 428/34.5 |
| 5,024,714 | 6/1991 | Lemelson | 156/324 |
| 5,030,676 | 7/1991 | Wallen . | |

*Primary Examiner*—Daniel Stemmer
*Attorney, Agent, or Firm*—Glenn E. Klepac

[57] ABSTRACT

A glass fiber reinforced building panel is made by extruding molten first and second webs of polymer compounds through spaced die openings, positioned a glass fiber mat between the first and second webs, pressing the webs and mat together, and cooling to form a building panel. The building panel of the invention has improved fire retardance and better field cutting and sawing performance compared with conventional, unreinforced building panels.

21 Claims, 2 Drawing Sheets

PLURAL EXTRUDER METHOD FOR MAKING A COMPOSITE BUILDING PANEL

This application is a continuation-in-part of U.S. Ser. No. 8/052,951, filed Apr. 23, 1993 and entitled "Vinyl Building Panel Reinforced by a Glass Fiber Mat and Method of Its Production", now abandoned.

FIELD OF THE INVENTION

The present invention relates to methods for making building panels for use on residential and manufactured home exteriors. More specifically, the invention relates to a method using plural extruders for making composite vinyl siding panels reinforced by a glass fiber mat.

BACKGROUND OF THE INVENTION

Numerous unreinforced vinyl siding panels are known in the prior art. The unreinforced panels are generally relatively inexpensive, and they can be embossed with attractive, simulated wood grain patterns. However, there is still a need to provide inexpensive vinyl siding panels having improved fire properties, greater tensile strength, higher flexural modulus and a lower coefficient of thermal expansion (CTE) than unreinforced prior art siding panels. The latter property is desirable in order to improve the siding panel's resistance to distortion accompanying changes in temperature. Such temperature-induced distortion is sometimes referred to as "oil canning".

Glass fibers are known in the prior art as high strength and relatively inexpensive reinforcing materials. Consequently, some workers have suggested the desirability of incorporating glass fibers into vinyl siding panels. For example, Rajewski U.S. Pat. No. 4,308,702 states that glass fibers may be used along with other conventional filler material such as additives, pigments, etc., in rigid plastic building panels produced by profile extrusion of polyvinyl chloride (PVC) and other thermoplastic polymers. Wallen U.S. Pat. No. 5,030,676 suggests a process in which an unplasticized polyvinyl chloride composition can be extrusion coated on a variety of preformed stock materials such as wood, aluminum, glass fibers and the like. Kohl U.S. Pat. No. 4,788,088 discloses a laminated plastic structure made by extruding a plastic tube around a fibrous reinforcing material. Kohl's extruder 26 has only a single orifice 30 which forms elliptical or round plastic tubing. The plastic tube is flattened around reinforcing material to form a laminate.

While the prior art contains some hints as to the desirability of incorporating glass fibers into vinyl siding panels, that result has heretofore remained unattainable at a reasonable production cost and quality of product. In addition there is still a need to provide a method and apparatus for producing glass fiber reinforced siding panels that are not wrinkled in the forming process.

It is a principal objective of the present invention to provide a vinyl building panel reinforced by a glass fiber mat and having improved fire retardance, strength, modulus and thermal expansion properties.

A related objective of the invention is to provide a commercially feasible method for making an extruded, glass fiber reinforced composite building panel.

Another objective of the invention is to provide a method and apparatus for reducing wrinkling in the composite building panel.

Additional objectives and advantages of our invention will become apparent to persons skilled in the art from the following detailed description and drawings.

SUMMARY OF THE INVENTION

In accordance with the present invention, there is provided a building panel comprising a glass fiber mat, a topcoat layer overlying the glass fiber mat and a basecoat layer underlying the glass fiber mat. The topcoat layer and basecoat layer are bonded together with the mat embedded in them so that the two layers and the mat are fused into a composite panel. In a preferred embodiment, the glass fiber mat comprises about 5–20 wt. % of the entire panel, preferably about 6–12 wt. %. The topcoat layer comprises about 10–60 wt. % of the panel, usually about 20–45 wt. % and preferably about 30–40 wt. %. The basecoat layer may comprise about 25–85 wt. % of the panel, preferably about 48–75 wt. %, and most preferably about 50–65 wt. %. The topcoat layer may have a thickness of about 3–25 mils, preferably about 10–18 mils, and more preferably about 12–16 mils. The basecoat layer may have a thickness of about 5–125 mils, preferably about 19–40 mils, and more preferably about 23–33 mils. In a particularly preferred panel having a thickness of about 44 mils (0.044 inch), the topcoat has a thickness of about 14 mils and the basecoat about 28 mils.

The glass fiber mat of the invention may be manufactured with wet-forming equipment in which wetted, randomly oriented glass fibers are formed into a mat in the presence of a binder. The glass fiber mat may have a weight of about 2–4 lb/100 ft$^2$, preferably about 2–3 lb/100 ft$^2$, depending upon the desired weight and thickness in the panel. In a particularly preferred embodiment, the mat has a weight of about 2.5 lb/100 ft$^2$. The glass fiber diameter ranges between about 8 and 20 microns. The randomly oriented glass fibers may be relatively short, having an average length of about 1–6 cm. An organic resin binder is used in forming the glass fiber mat. In a particularly preferred panel having a polyvinyl chloride topcoat layer and basecoat layer, the organic resin in the binder may be a polymer compatible with the polymers in the topcoat and basecoat layers. A particularly preferred organic binder is preferably a mixture of thermoplastic and thermoset polymers. A particularly preferred thermoplastic polymer is a cross-linked styrene-butadiene-acrylate copolymer. Some suitable thermoset polymers include melamine-formaldehyde resins and urea-formaldehyde resins.

Alternatively, a woven glass fiber mat may be utilized. Woven mats are stronger than mats made with randomly oriented fibers, but they are more expensive.

The topcoat and basecoat layers of the building panel are formed from molten polymer compounds containing suitable thermoplastic polymers. Some useful thermoplastic polymers include polyvinyl chloride (PVC), polyolefins (e.g., polypropylene or polyethylene), polycarbonates, acrylics, polyvinyl fluorides and other suitable thermoplastics. PVC is the preferred thermoplastic polymer for use in the invention. The topcoat layer is preferably a rigid or semi-rigid, weatherable PVC compound.

The basecoat layer and topcoat layer each may contain various other additives in addition to PVC. Such additives include various pigments or fillers, heat stabilizers, impact modifiers, processing aids and lubricants. Some suitable pigments and fillers are titanium dioxide, calcium carbonate, kaolin clay, silica and talc.

The heat stabilizer additives are preferably organotin compounds including the alkyl mercaptides, maleates and carboxylates. Some examples of suitable organotin stabilizers are dialkyltin allyl mercaptides, dibutyltin maleate, modified butyltin maleates, octyltin mercaptocarboxylic acids, dibutyltin dilaurate, and organotin derivatives of 2-mercaptoethanol. The organotin stabilizer preferably is present in a concentration of about 0.2–2 parts per 100 parts unplasticized polyvinyl chloride resin (0.2–2 phr). The impact modifiers may comprise chlorinated polyethylene, acrylic copolymers, acrylonitrile-butadiene-styrene resins and ethylene vinyl acetate copolymers. One suitable group of impact modifiers is sold by Rohm & Haas Company under the trademark ACRYLOID. The impact modifiers are typically employed at a level of about 0.4–10 phr.

One suitable processing aid is a low viscosity acrylic copolymer. Some useful lubricants include calcium, aluminum, zinc and magnesium stearates, and various waxes, soaps and fatty acid derivatives.

A building panel is formed in accordance with the invention by extruding a molten polymer compound through an opening in a first extrusion die to form a molten first web; extruding a molten polymer compound through an opening in a second extrusion die to form a molten second web spaced from the first web; and positioning a glass fiber mat between the first and second webs. The glass fiber mat is preferably continuously supplied from a coiled roll. The first and second webs and the mat are then pressed together before the webs have solidified so that the webs extend through the mat to form a unitary panel. The first and second die openings are preferably generally linear and generally parallel to each other.

It is an advantage of the method of the present invention that the first and second webs may vary in composition and in thickness. For example, in a particularly preferred embodiment, the polymer compound in the first web contains more titanium dioxide pigment and other expensive additives than the polymer compound in the second web, resulting in a basecoat layer containing less expensive ingredients than the topcoat layer. Accordingly, building panels made in accordance with the method of the present invention are made more economically than panels having the same composition in both layers.

The first and second webs are pressed into the glass fiber mat by a pair of rotating rolls before the polymer compounds have solidified. Preferably, one of the rolls has a metal outer portion and one of the rolls has a resiliently compressible outer portion. An apparatus including a first steel roll and a second rubber roll is particularly preferred. The combination of a resiliently compressible rubber roll with a steel roll provides greater resistance to wrinkling than when two steel rolls are utilized.

When the first and second webs are pressed into the glass fiber mat, the webs are maintained at a temperature above the melting point of the polymer to facilitate polymer flow into the glass mat. In a preferred panel made with a polyvinyl chloride (PVC) compound, the two PVC webs should be no less than 25° F. above their melt temperature, preferably no less than about 50° F. above such temperature as they are pressed together with the mat.

The temperatures of the two rolls are controlled so that their temperature difference is less than about 50° F. Controlling the roll temperatures assures that the two molten webs will have similar temperatures as they are pressed into the glass fiber mat. Because the steel roll conducts heat away from the molten first web faster than the rubber roll conducts heat from the molten second web, it is sometimes desirable to heat the steel roll or to cool the rubber roll. Such procedure equalizes the temperatures of the first and second webs when they join the glass fiber mat.

The opposed rolls press the first and second webs through the mat so that the webs extend through the mat and join to form a unitary panel having topcoat and basecoat layers. At least one of the opposed rolls is preferably a steel embossing roll which produces an embossed, simulated woodgrain pattern on one surface of the panel. Shaper dies then preferably shape the panel into a desired shape before it has solidified so that reheating is avoided. The shaped panel is solidified by cooling and cut into desired lengths for packing and shipment to customers.

The glass fiber reinforced panel of the invention has improved fire retardance compared with conventional, unreinforced vinyl building panels. The reinforced panel has better field cutting and sawing performance as well, even under cold weather conditions. Flexural modulus, coefficient of thermal expansion (CTE) and tensile strength are also improved.

DETAILED DESCRIPTION OF A PREFERRED EMBODIMENT

Figure 1:
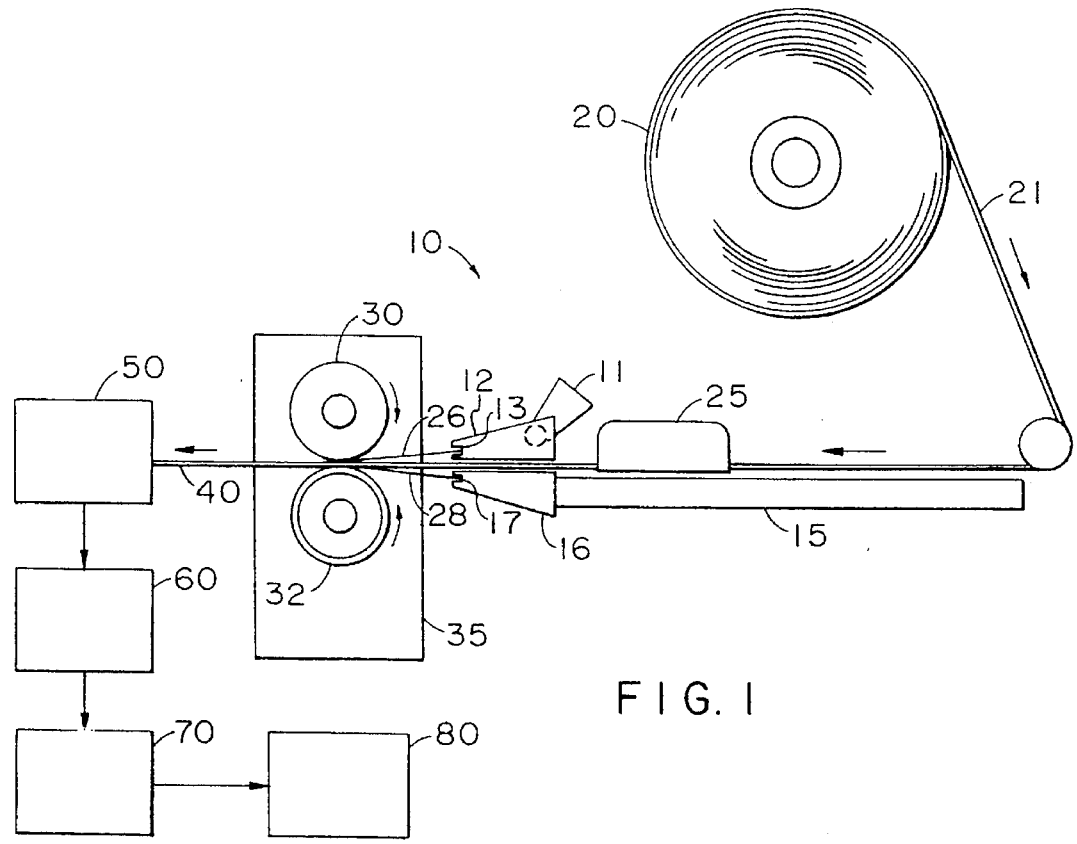
FIG. 1 is a schematic illustration of an apparatus and method for manufacturing a glass reinforced plastic building panel in accordance with the present invention.

There is schematically shown in FIG. 1 an apparatus 10 for manufacturing glass fiber reinforced building panels in accordance with the present invention. The apparatus includes a first extruder 11 connected with a first steel extrusion die 12 having a generally linear opening 13, a second extruder 15 connected with a second steel extrusion die 16 having a generally linear opening 17, and a coiled roll 20 supplying a glass fiber mat 21 between the extrusion dies 12, 16. An electric radiant heater 25 may heat the mat 21 before it passes between the dies 12, 16.

The first extruder 11 has a tapered conical screw with a maximum width of 62 mm. The second extruder 15 is generally cylindrical, with a 100 mm diameter over its entire length. The extruders 11, 15 are commercially available from American Maplan Corporation. Many different extruders of various designs can be used depending on the quantity and speed of extrudate that may be desired.

The first and second extrusion dies 12, 16 extrude molten first and second webs or topcoat and basecoat layers 26, 28 comprising sheets preferably having a width approximately equal to the width of the desired panel (approximately 12-½ inches for a typical siding panel). The topcoat layer 26, glass fiber mat 21 and basecoat layer 28 are pressed together between an embossing roll 30 and a backup roll 32 supported by a roll stand 35. The backup roll 32 has at least an outer portion made of resilient, compressible material. In a preferred embodiment, the compressible material is a hard rubber annulus 36 approximately 2 inches thick around a steel core. Rolls 30, 32 are preferably hollow so that they may be water cooled or heated as needed to maintain their temperatures approximately equal.

Figure 2:
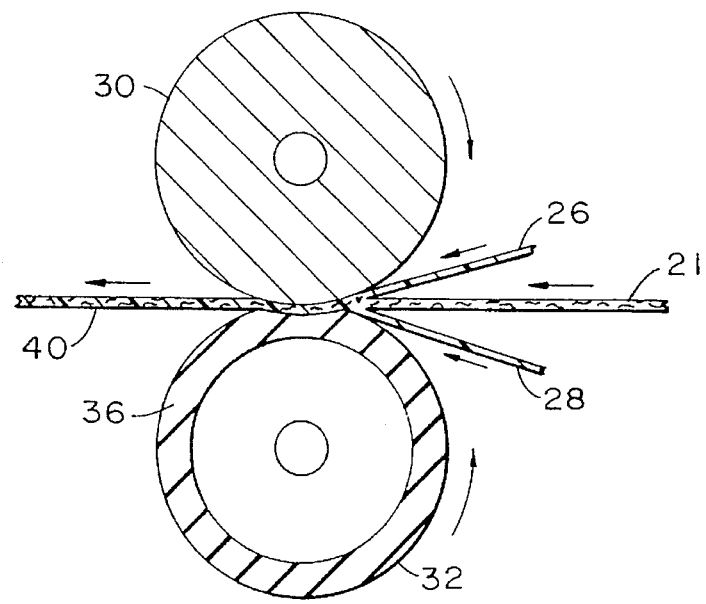
FIG. 2 is a side elevation of the rolls of FIG. 1 in greater detail.
Figure 3:
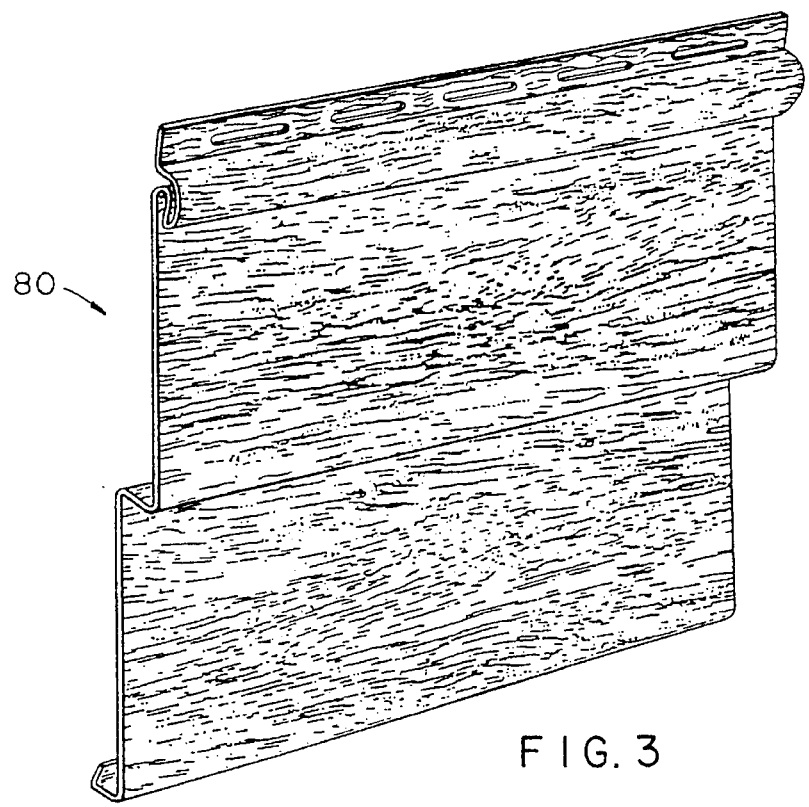
FIG. 3 is a perspective view of a vinyl siding panel made in accordance with the invention.

Sufficient pressure is applied by the rolls 30, 32 that the rubber annulus 36 on roll 32 is compressed and deformed to press against the bottom PVC web for at least 2 inches, and preferably 2-½ to 6 inches of the length of the web, as best shown in FIG. 2. Sufficient pressure is applied by the two rolls against the PVC webs for the topcoat layer 26 and the basecoat layer 28 each to be driven into the mat 21 to join and form a unitary panel 40. The webs of material may travel at approximately 30–150 fpm, depending on the capacity of the extruders and width of the web being extruded, among other variables.

The topcoat 26 and basecoat 28 are preferably maintained at a temperature above the melting point of the polymer to facilitate flow of the polymer into the glass mat or glass fiber layer 21 so the two coats 26, 28 will bond together into a unitary panel with the glass embedded in the polymer. The PVC webs should be no less than 25° F. above the melt temperature of the PVC webs, and preferably no less than 50° F. above such melt temperature, as the webs are pressed together by the rolls 30 and 32. With a typical PVC blend, the blend temperature should be at least 300°–425° F. when the webs are pressed together by the rolls 30, 32. The roll 32 is preferably water cooled so it will not become overheated as it presses the webs into a unitary panel.

The unitary panel 40 is preferably passed through shaping dies 50 prior to passing through a cooling bath 60 and a cutter 70 to form completed building panels 80. Shaping dies are not required for flat panels.

Figures 4, 5, 6:
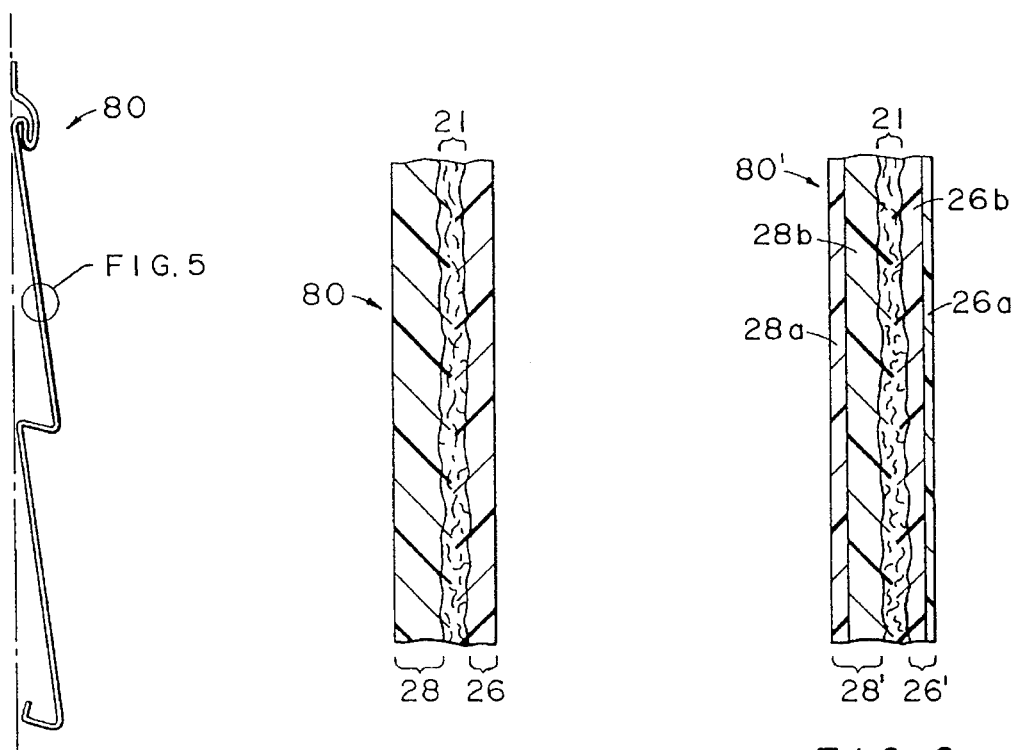
FIG. 4 is a side elevational view of the vinyl siding panel of FIG. 2.
FIG. 5 is an enlarged, fragmentary view of the vinyl siding panel of FIG. 3.
FIG. 6 is an enlarged, fragmentary side elevational view of an alternative vinyl siding panel of the invention.

Referring now to FIG. 6, there is shown an alternative embodiment of a vinyl siding panel 80 produced in accordance with the present invention. The panel 80 includes a topcoat layer 26, a basecoat layer 28 and a glass fiber mat 21 between the two layers 26, 28. The topcoat layer 26 includes an outer layer or outer portion 26a spaced from the mat 21 and an inner layer or inner portion 26b adjacent the mat 21. The basecoat layer 28 includes an outer layer or outer portion 28a spaced from the mat 21 and an inner layer or inner portion 28b adjacent the mat 21. It is an advantage of the present invention that portions 26a, 26b of the topcoat layer 26 may be coextruded by the first extruder in a variety of thicknesses and compositions. Similarly, portions 28a, 28b of the basecoat layer 28 may also be coextruded by the second extruder in a variety of thicknesses and compositions. Usually, the outer portions 26a, 28a will be thinner and will contain more titanium dioxide pigment and other expensive ingredients than the inner portions 26b, 28b. In one embodiment, the topcoat layer 26 contains two coextruded layers 26a, 26b and the basecoat layer 28 comprises a single layer.

While the invention has been described in terms of preferred embodiments, the claims appended hereto are intended to encompass all embodiments which fall within the spirit of the invention. For example, the webs of PVC and glass could be pressed together between two continuous belts supported and driven by rollers over which the belts are mounted. The rolls shown in FIGS. 1 and 2 could also be reversed with the top roll being compressible and the bottom roll being a steel roll. The roll 30 could also be a smooth roll instead of an embossing roll.

What is claimed is:

1. A method for making a glass fiber reinforced building panel comprising:
   (a) extruding a molten polymer compound to form a molten first web comprising an outer layer and an inner layer wherein at least said outer layer contains a pigment, said outer layer containing more pigment than said inner layer;
   (b) extruding a molten polymer compound to form a molten second web spaced from said first web;
   (c) positioning a glass fiber mat between said first web and said second web so that said inner layer is adjacent said mat and said outer layer is spaced from said mat;
   (d) pressing the first and second webs and said mat together before said webs have completely solidified so that said first web and second web each extend into said glass fiber mat and join to form a composite panel comprising a topcoat layer and a basecoat layer; and
   (e) cooling said composite panel to form a building panel.

2. The method of claim 1 wherein said first web is formed by extruding a molten polymer compound through a generally linear opening in a first extrusion die and said second web is formed by extruding a molten polymer compound through a generally linear opening in a second extrusion die.

3. The method in accordance with claim 2 wherein said openings are generally parallel.

4. The method in accordance with claim 1 wherein said first web and said second web each contain polyvinyl chloride.

5. The method in accordance with claim 1 wherein said first web and said second web each contain a pigment and said first web contains more pigment than said second web.

6. The method in accordance with claim 1 wherein said topcoat layer has a thickness of about 10–18 mils and said basecoat layer has a thickness of about 19–40 mils.

7. The method in accordance claim 1 wherein said topcoat layer has a thickness of about 12–16 mils and said basecoat layer has a thickness of about 23–33 mils.

8. The method in accordance with claim 1 wherein said second web comprises a single layer having a uniform composition.

9. The method in accordance with claim 1 wherein step (d) comprises pressing said first and second webs between two rotating rolls, at least one of said rolls having a resiliently compressible outer portion.

10. The method in accordance with claim 9 wherein one of said rolls has a resiliently compressible outer portion and one of said rolls has a metal outer portion.

11. The method in accordance with claim 10 further comprising:
   (f) controlling temperatures of said rolls to a difference of less than about 50° F.

12. The method in accordance with claim 11 wherein step (f) comprises heating said metal outer portion or cooling said resiliently compressible outer portion.

13. The method in accordance with claim 1 wherein said glass fiber mat comprises glass fibers having an average length of about 1 to 6 cm and a binder comprising a mixture of thermoplastic and thermoset polymers.

14. The method in accordance with claim 13 wherein said thermoplastic polymer comprises a styrene-butadiene-acrylate polymer.

15. A method for making a fiber reinforced polymer panel comprising:

extruding a substantially flat molten first web of polymer material, said first web comprising an outer layer and an inner layer wherein at least said outer layer, contains a pigment, said outer layer containing more pigment than said inner layer;

extruding a substantially flat molten second web of polymer material spaced from and substantially parallel with said first web;

positioning a fiber mat between and substantially parallel with, said first web and said second web so that said inner layer is adjacent said mat and said outer layer is spaced from said mat;

pressing said first and second webs and said mat together while said webs are molten to flow polymer material through said mat and join said webs and said mat into a substantially flat composite panel; and cooling said composite panel.

16. A method as set for in claim 15 in which said pressing is by at least one resiliently compressible roll to minimize wrinkling of the composite panel.

17. The method of claim 15 wherein said first web and said second web each contain polyvinyl chloride and the pigment in said outer layer comprises titanium dioxide.

18. A method for making a glass fiber reinforced polymer panel comprising:

extruding a first substantially flat molten first web of polymer material from a first extrusion die, said first web comprising an outer layer and an inner layer wherein at least said outer layer contains a pigment, said outer layer containing more pigment than said inner layer;

extruding a second substantially flat molten second web of polymer material from a second extrusion die;

positioning a glass fiber mat between said first web and said second web so that said inner layer is adjacent said mat and said outer layer is spaced from said mat;

moving said molten webs and a glass fiber mat substantially continuously through a roll nip with said webs on opposite sides of said mat to press said molten webs together and against said mat therebetween wherein said roll nip includes a resiliently compressible material and the webs are pressed together under a sufficient force to flow polymer material through said mat and join the webs and the mat together into a flat composite panel with minimal wrinkling.

19. A method as set forth in claim 18 in which said roll nip is substantially horizontal.

20. The method of claim 18 wherein said first web and said second web each contain polyvinyl chloride.

21. The method of claim 20 wherein said glass fiber mat comprises a plurality of glass fibers and a binder comprising a mixture of thermoplastic and thermoset polymers.

* * * * *